United States Patent [19]

Tanaka

[11] Patent Number: 5,529,154
[45] Date of Patent: Jun. 25, 1996

[54] VALVE STRUCTURE FOR DAMPER

[75] Inventor: Kazuhiko Tanaka, Tochigi, Japan

[73] Assignee: Showa Corporation, Saitama, Japan

[21] Appl. No.: 349,814

[22] Filed: Dec. 6, 1994

[30]  Foreign Application Priority Data

Dec. 6, 1993 [JP] Japan .................................. 5-305598
Sep. 14, 1994 [JP] Japan .................................. 6-220606

[51]  Int. Cl.⁶ ................................................... F16F 9/348
[52]  U.S. Cl. ............................ 188/322.15; 188/280
[58]  Field of Search ................................ 188/280, 282, 188/317, 322.15

[56]  References Cited

U.S. PATENT DOCUMENTS

| | | | |
|---|---|---|---|
| 4,895,229 | 1/1990 | Kato | 188/322.15 X |
| 4,964,493 | 10/1990 | Yamaura et al. | 188/322.15 |
| 5,085,300 | 2/1992 | Kato et al. | 188/317 X |
| 5,115,892 | 5/1992 | Yamaoka et al. | 188/322.18 X |

FOREIGN PATENT DOCUMENTS

| | | | |
|---|---|---|---|
| 60-99341 | 7/1985 | Japan . | |
| 4185929 | 7/1992 | Japan | 188/322.15 |
| 2225409 | 5/1990 | United Kingdom | 188/322.15 |

*Primary Examiner*—Josie Ballato
*Attorney, Agent, or Firm*—Merchant, Gould, Smith, Edell, Welter & Schmidt

[57]  ABSTRACT

A valve structure for use in a damper has a cylinder, a piston rod axially movably disposed in the cylinder, a piston or dividing member mounted on an end of the piston rod in the cylinder and dividing an interior space of the cylinder into two oil chambers one on each side of the dividing member, the dividing member having a valve seat, and a circular resilient valve assembly supported at a circumferential edge thereof on the dividing member and having a free end seatable on the valve seat. The circular resilient valve assembly includes a circular auxiliary resilient valve, a circular intermediate resilient sheet, and a circular main resilient valve which have identical inside and outside diameters, the circular auxiliary resilient valve, the circular intermediate resilient sheet, and the circular main resilient valve being stacked in the order named successively from the valve seat. The circular intermediate resilient sheet has at least one recess defined therein and opening at a free end thereof for allowing the circular auxiliary resilient valve to flex. The circular resilient valve assembly can flex depending on a differential pressure between the two oil chambers to produce a damping oil path for applying a damping force against axial movement of the piston rod with respect to the cylinder.

17 Claims, 7 Drawing Sheets

VALVE STRUCTURE FOR DAMPER

BACKGROUND OF THE INVENTION

1. Field of the Invention

The present invention relates to a damper, and more particularly to a valve structure for generating damping forces as a piston of a damper moves back and forth.

2. Description of the Prior Art

FIG. 14 of the accompanying drawings illustrates a conventional hydraulic damper. As shown in FIG. 14, the conventional hydraulic damper has a cylinder 101 and a piston rod 102 extending axially therein. A piston 103 is mounted on a distal end of the piston rod 102 in the cylinder 101 in sliding contact with an inner circumferential surface of the cylinder 101. The piston 103 divides the interior space of the cylinder 101 into two oil chambers S1 and S2, one on each side of the piston 103. The piston 103 has a compression oil passage 104 and an expansion oil passage 105 which are defined therein. A compression valve 106 for opening and closing the compression oil passage 104 and an expansion valve 107 for opening and closing the expansion oil passage 105 are disposed one on each side of the piston 103. The compression valve 106 has a slit 109a defined therein. The expansion valve 107 comprises a plurality of plate valves 111, 112, 113 positioned adjacent to a valve seat 110 of the piston 103 remote from the compression valve 106.

Each of the plate valves 111, 112, 113 is of a circular shape, and the valve seat 110 for bearing these plate valves 111, 112, 113 is of a circular (annular) shape as shown in FIG. 15(a) of the accompanying drawings. The valve structure of the conventional hydraulic damper has such damping force characteristics in an expansion stroke that, as indicated by the curve III in FIG. 6, when the speed of travel of the piston 103 is low, working oil in the oil chamber S1 flows through the slit 109a of the compression valve 109 and the compression oil passage 104 into the oil chamber S2, producing a relatively steep damping force characteristic curve, and when the piston 103 travels at a medium speed, working oil flowing into the expansion oil passage 105 forces the expansion valve 107 to open, producing a relatively gradual damping force characteristic curve because of the circular (annular) valve seat 110. Therefore, the circular (annular) valve seat 110 fails to provide linear damping force characteristics due to an inflection between the low- and medium-speed ranges.

Another hydraulic damper employs a noncircular (nonannular) valve seat as shown in FIG. 15(b) of the accompanying drawings for opening the valve gradually when the piston speed is low, so that substantially linear damping force characteristics are provided throughout the low- and medium-speed ranges. However, the noncircular valve seat causes the valve to open to a large extent, resulting in relatively steep damping force characteristics in a higher speed range, as shown in FIG. 6.

Japanese laid-open patent publication No. 60-99341 discloses a hydraulic damper which employs a circular valve seat and an expansion valve similar to the expansion valve 107 shown in FIG. 14. The expansion valve includes an auxiliary plate valve 111, an intermediate plate valve or sheet 112, and a main plate valve 113, the intermediate plate valve 112 having an eccentric shape as shown in FIG. 15(c) of the accompanying drawings. The expansion valve flexes gradually in its fully circumferential region after portions of the auxiliary and main plate valves 111, 113 have started flexing, thereby eliminating any inflection from low- and medium-speed ranges.

While the valve structure disclosed in the above publication provides the same damping force characteristics in the medium-speed range as those of the valve structure with the circular valve seat, it is difficult to grasp the correlation between the configuration of the intermediate plate valve and the generated damping forces.

SUMMARY OF THE INVENTION

It is therefore an object of the present invention to provide a valve structure for a damper which can produce smooth damping force characteristics in an entire speed range of back-and-forth movement of a piston and substantially linear damping force characteristics from low- to medium-speed ranges of the back-and-forth movement of the piston.

According to the present invention, there is provided a valve structure for use in a damper, comprising a cylinder, a piston rod axially movably disposed in the cylinder, a dividing member mounted on an end of the piston rod in the cylinder and dividing an interior space of the cylinder into two oil chambers, one on each side of the dividing member, the dividing member having a valve seat, and a circular resilient valve assembly supported at a circumferential edge thereof on the dividing member and having a free end seatable on the valve seat, the circular resilient valve assembly comprising a circular auxiliary resilient valve, a circular intermediate resilient sheet, and a circular main resilient valve which have identical overall inside and outside diameters, the circular auxiliary resilient valve, the circular intermediate resilient sheet, and the circular main resilient valve being stacked in the order named successively from the valve seat, the circular intermediate resilient sheet having at least one recess defined therein and opening at a free end thereof for allowing the circular auxiliary resilient valve to flex, whereby the circular resilient valve assembly can flex depending on a differential pressure between the two oil chambers to produce a damping oil path for applying a damping force against axial movement of the piston rod with respect to the cylinder.

Alternatively, the circular resilient valve assembly may comprise a circular auxiliary resilient valve and a circular main resilient valve which have identical overall and outside diameters, the circular auxiliary resilient valve and the circular main resilient valve being stacked in the order named successively from the valve seat, the main valve having at least one recess defined therein and opening at a free end thereof for allowing the circular auxiliary resilient valve to flex.

Preferably, the valve seat is of a circular shape, and the recess is of a sectorial shape, a semicircular shape, or a U shape.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
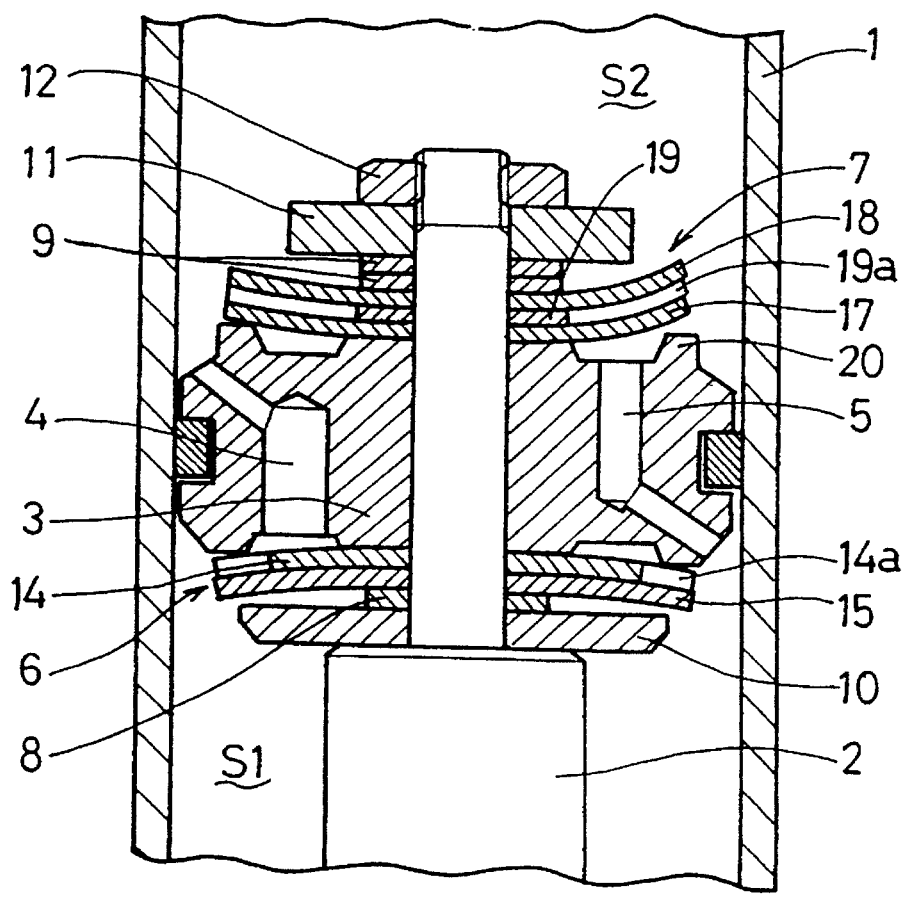
FIG. 1 is a fragmentary cross-sectional view of a damper around its piston, the damper incorporating a valve structure according to a first embodiment of the present invention.

FIG. 1 shows a damper around its piston, the damper incorporating a valve structure according to a first embodiment of the present invention. As shown in FIG. 1, the damper includes a cylinder 1 and a piston rod 2 extending wardly therein. A piston (dividing member) 3 is mounted on a distal end of the piston rod 2 in the cylinder 1 in sliding contact with an inner circumferential surface of the cylinder 1. The piston 3 divides the interior space of the cylinder 1 into two oil chambers S1 and S2 one on each side of the piston 3. The piston 3 has a compression oil passage 4 and an expansion oil passage 5 which are defined therein. A compression valve assembly 6 for opening and closing the compression oil passage 4 and an expansion valve assembly 7 for opening and closing the expansion oil passage 5 are mounted respectively on opposite axial surfaces of the piston 3. A sheet 8 is disposed behind the compression valve assembly 6, and a pair of sheets 9 is disposed behind the expansion valve assembly 7. The piston 3, the compression valve assembly 6, the expansion valve assembly 7, the sheet 8, and the sheets 9 are axially clamped between retainers 10, 11 and fastened in place by a nut 12 threaded on the tip end of the piston rod 2.

The compression valve assembly 6 comprises two inner and outer resilient circular values 14, 15, the inner valve 14 having a slit 14a defined therein. The expansion valve assembly 7 comprises a circular resilient auxiliary valve 17, a circular resilient main valve 18, and a circular resilient intermediate sheet 19 interposed therebetween. The piston 3 has a circular (annular) valve seat 20 on its surface near the expansion valve assembly 7 for abutting contact with the circular auxiliary valve 17, the valve seat 20 surrounding the expansion oil passage 5.

Figure 2:
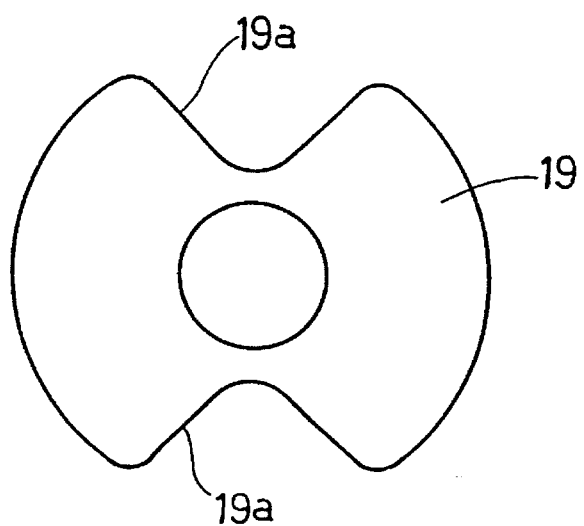
FIG. 2 is a plan view of an intermediate plate valve or sheet in the valve structure shown in FIG. 1.

The intermediate sheet 19 has an overall outside diameter between recesses which is the same as those of the auxiliary valve 17 and the main valve 18. As shown in FIG. 2, the intermediate sheet 19 has a pair of diametrically opposite sectorial recesses 19a defined symmetrically therein across the central axis thereof. The sectorial recesses 19a serve to allow the auxiliary valve 17 to flex partly under a differential pressure between the oil chambers S1, S2.

The compression oil passage 4, the compression valve assembly 6 for opening and closing the compression oil passage 4, the expansion oil passage 5, and the expansion valve assembly 7 for opening and closing the expansion oil passage 5 jointly make up a damping force generating means.

Figure 3:
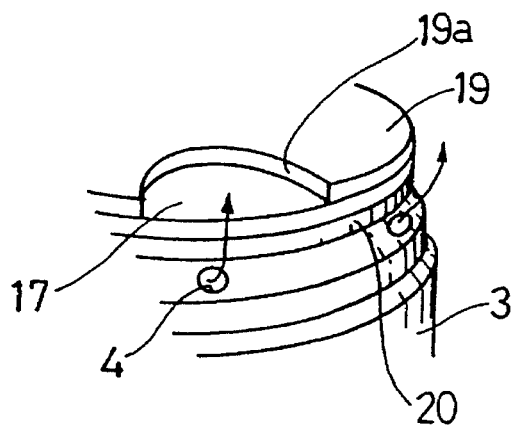
FIG. 3(a) is a fragmentary perspective view showing the manner in which the valve structure in the damper shown in FIG. 1 operates when the piston moves in a low-speed range.
FIG. 3(b) is a graph showing damping force characteristics of the damper at the time the valve structure operates as shown in FIG. 3(a)
Figure 3:
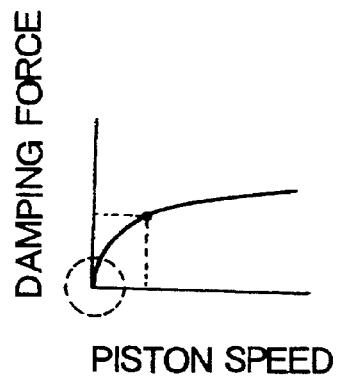

When the piston rod 2 moves downwardly as viewed in FIG. 1 in an expansion stroke, working oil in the oil chamber S1 flows through the slit 14a into the compression oil passage 4, and then flows from the compression oil passage 4 into the oil chamber S2 regardless of the expansion valve assembly 7, as long as the piston 3 moves in a low-speed range, as shown in FIG. 3(a). Thus, the slit 14a serves as an orifice for generating a damping force. Accordingly, as shown in damping force characteristics shown in FIG. 3(b), the damping force gradually increases from a region encircled by a dotted-line circle in FIG. 3(b), depending on the opening of the compression oil passage 4.

Figure 4:
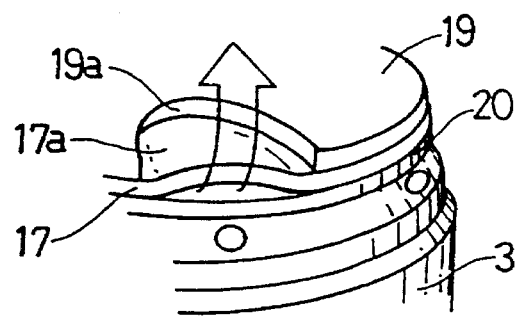
FIG. 4(a) is a fragmentary perspective view showing the manner in which the valve structure in the damper shown in FIG. 1 operates when the piston moves in a medium-speed range.
FIG. 4(b) is a graph showing damping force characteristics of the damper at the time the valve structure operates as shown in FIG. 4(a)
Figure 4:
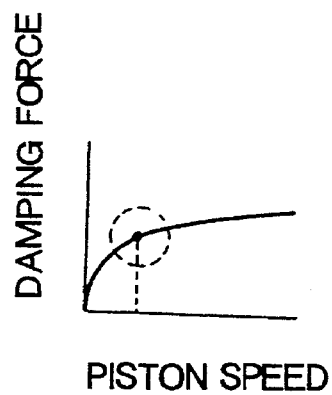

As the piston speed approaches a medium-speed range, working oil flowing into the expansion oil passage 5 forces portions 17a of the auxiliary valve 17 to flex axially into the corresponding recesses 19a in the intermediate sheet 19, as shown in FIG. 4(a). Since the portions 17a of the auxiliary valve 17 start opening at first, the characteristic curve of the generated damping force is smooth without infections in a region encircled by a dotted-line circle in FIG. 4(b).

Figure 5:
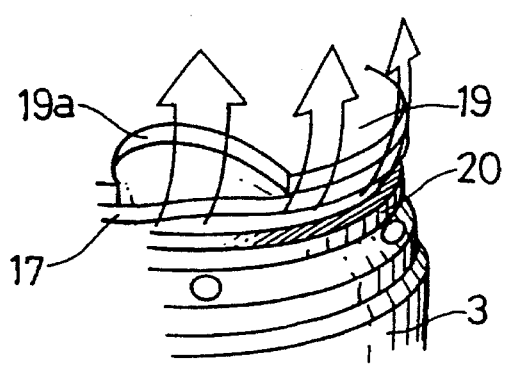
FIG. 5(a) is a fragmentary perspective view showing the manner in which the valve structure in the damper shown in FIG. 1 operates when the piston moves in a high-speed range.
FIG. 5(b) is a graph showing damping force characteristics of the damper at the time the valve structure operates as shown in FIG. 5(a)
Figure 5:
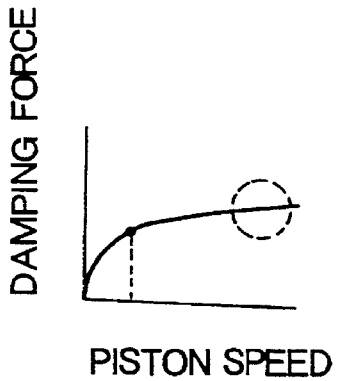

When the piston 3 moves in a high-speed range, the expansion valve assembly 7 opens in its entirety under the pressure of working oil flowing into the expansion oil passage 5, as shown in FIG. 5(a). At this time, since the valve seat 20 is of a circular shape, the generated damping force gradually increases, without a sharp rise, in a region encircled by a dotted-line circle in FIG. 5(b).

Figure 6:
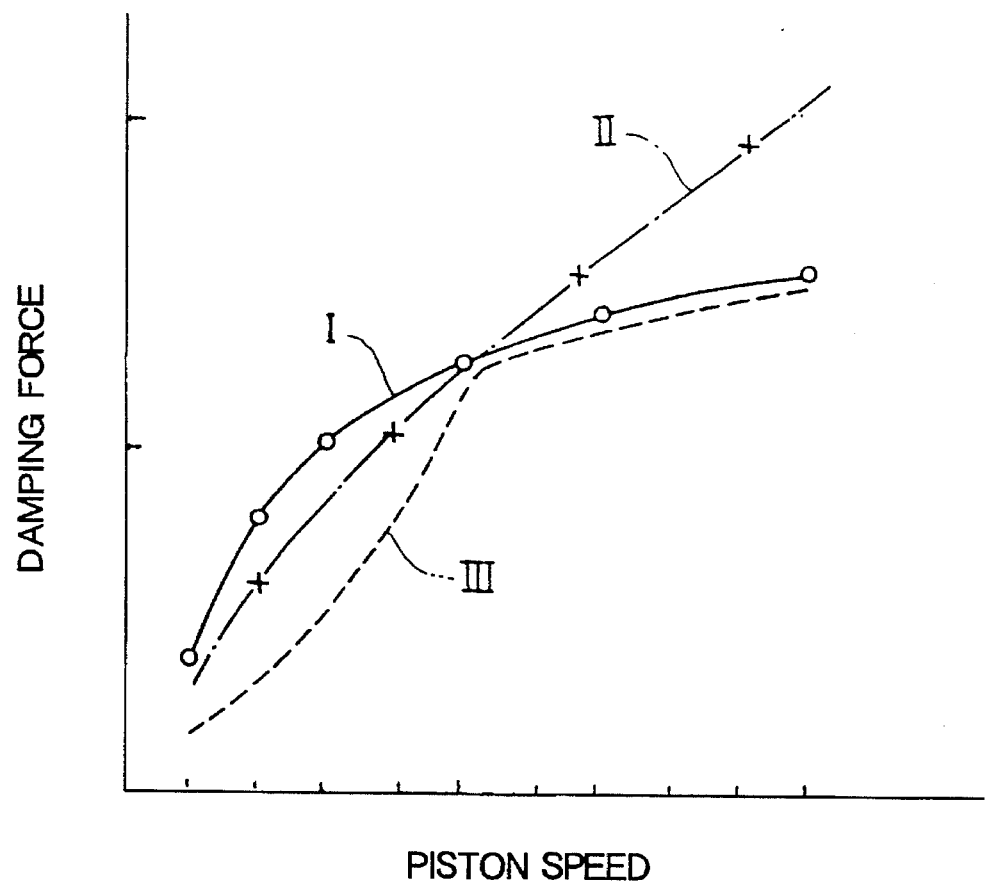
FIG. 6 is a graph showing damping force characteristics of dampers having various valve structures.

The sectorial recesses 19a defined in the intermediate sheet 19 are effective to provide a smooth inflection-free damping force characteristic curve I shown in FIG. 6 even though the expansion valve assembly 7 is circular in shape, with any change in the damping force being gradual in the medium- and high-speed ranges. Since the damping force varies depending on the number, shape, angle, and depth of the recesses 19a in the intermediate sheet 19, it is easy to grasp the correlation between the shape of the intermediate sheet 19 and the damping force.

Figure 7A:
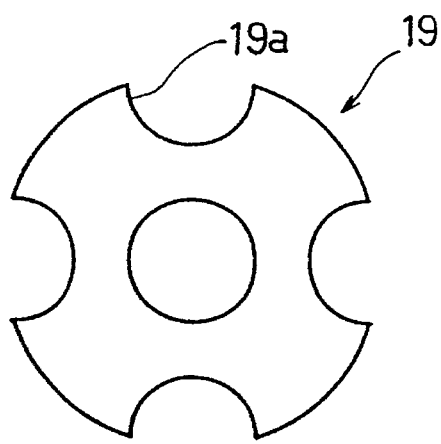
FIG. 7(a) is a plan view of a first modification of the intermediate sheet according to the first embodiment.
Figure 7B:
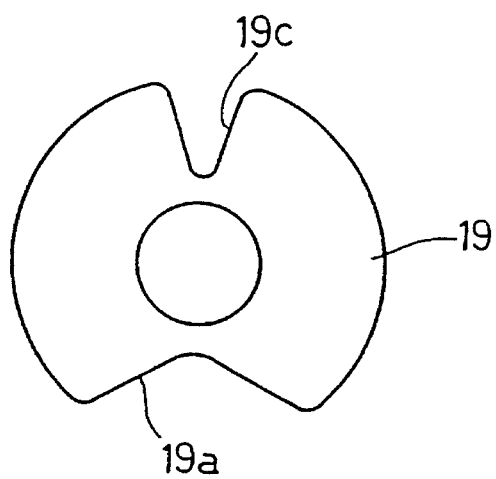
FIG. 7(b) is a plan view of a second modification of the intermediate sheet according to the first embodiment.

The recesses 19a in the intermediate sheet 19 are not limited to the shape shown in FIG. 2. As shown in FIG. 7(a), the intermediate sheet 19 may have four semicircular or U-shaped recesses 19a angularly spaced at 90°. Alternatively, as shown in FIG. 7(b), the intermediate sheet 19 may have a recess 19a defined by two radial sides angular spaced a greater angle from each other and another recess 19c defined by two radial sides angular spaced a smaller angle from each other. Further alternatively, the intermediate sheet 19 may have a combination of recesses of different shapes. Instead of the circular intermediate sheet 19, a noncircular (nonannular) sheet with recesses may be employed. A similar valve arrangement may also be incorporated in the compression valve assembly 6, or a fixed dividing member such as a bottom valve or the like.

In the first embodiment of the present invention, as described above, the intermediate sheet sandwiched between the main valve and the auxiliary valve is of the same overall outside diameter between recesses as those of the main valve and the auxiliary valve, and has sectorial recesses or recesses of other shapes. The intermediate sheet is effective to provide smooth damping force characteristics in the entire speed range of back-and-forth movement of the piston 3, substantially linear damping force characteristics from the medium-speed range to the high-speed range, and damping force characteristics determined by the valve seat in the medium- and high-speed ranges. It is also easy to grasp the correlation between the shape of the intermediate sheet 19 and the generated damping force depending on the number, shape, angle, and depth of the recesses 19a in the intermediate sheet 19.

A valve structure according to a second embodiment of the present invention, which is incorporated in a damper, will be described below with reference to FIG. 8.

Figure 8:
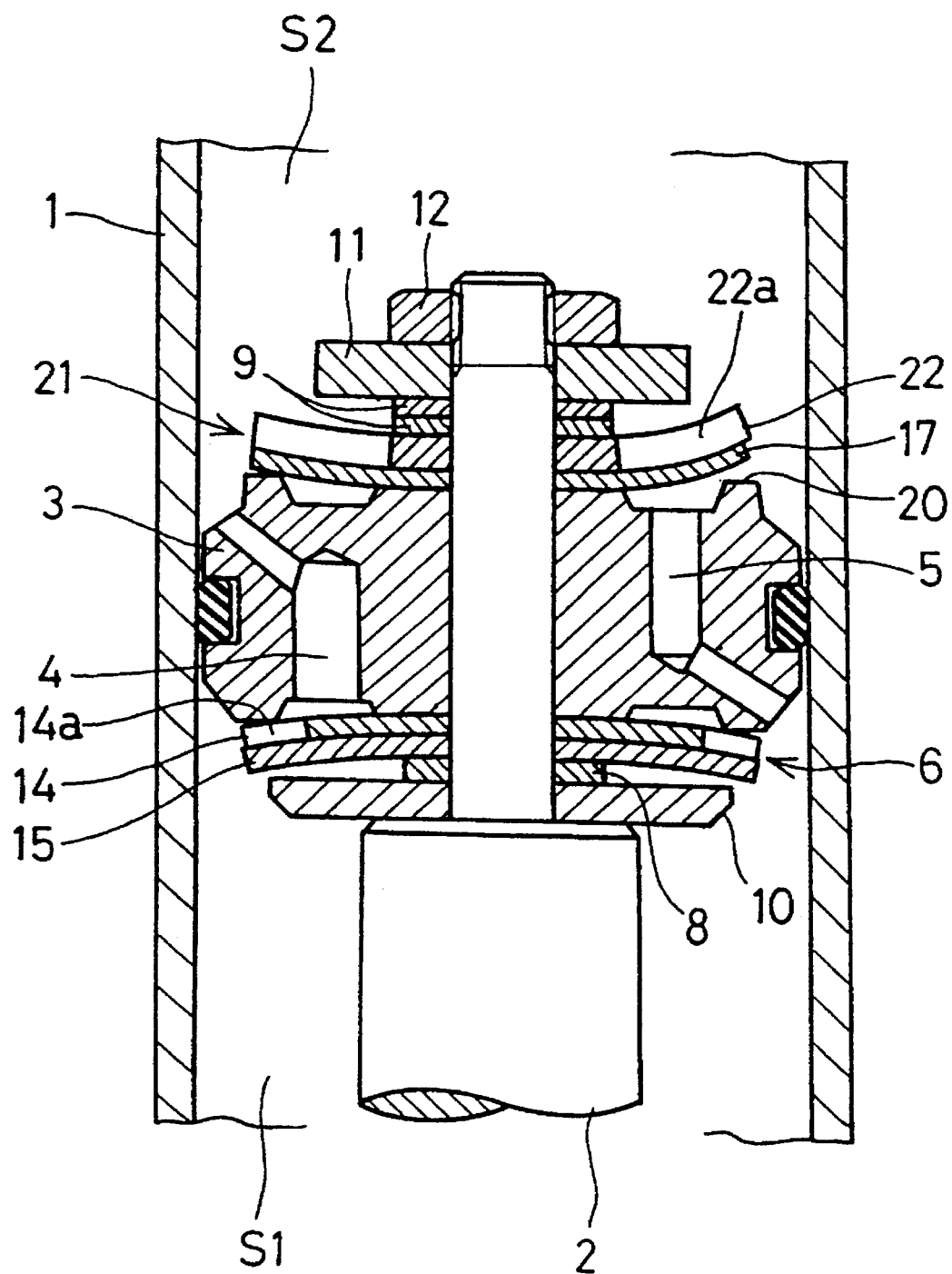
FIG. 8 is a fragmentary cross-sectional view of a damper around its piston, the damper incorporating a valve structure according to a second embodiment of the present invention.

As shown in FIG. 8, the damper on the piston 3 is of substantially the same structure as the damper shown in FIG. 1 except for an expansion valve assembly 21. The expansion valve assembly 21 comprises an annular resilient auxiliary valve 17 that can be seated on the valve seat 20 of the piston 3, and a resilient main valve 22 held against a flexing surface of the auxiliary valve 17. The auxiliary valve 17 and the main valve 22 are concentrically supported on the piston rod 2. The main valve 22 comprises a resilient sheet having at least one sectorial recess 22a defined in a free end thereof as with the intermediate sheet 19 according to the first embodiment. The main valve 22 has a thickness greater than the thickness of the auxiliary valve 17.

The thicker main valve 22 is partly held in contact with the auxiliary valve 17 for resiliently holding the auxiliary valve 17 against undue flexural displacement. The thicker main valve 22 serves to perform the combined function of the main valve 18 and the intermediate sheet or valve 19 according to the first embodiment. As a result, damping force characteristics in the low- and medium-speed ranges can be set up freely with a relatively simple structure made up of a reduced number of parts.

A valve structure according to a third embodiment of the present invention, which is incorporated in a damper, will be described below with reference to FIGS. 9, 10, 11(a), 11(b), 12(a), 12(b), 13(a), and 13(b).

Figure 9:
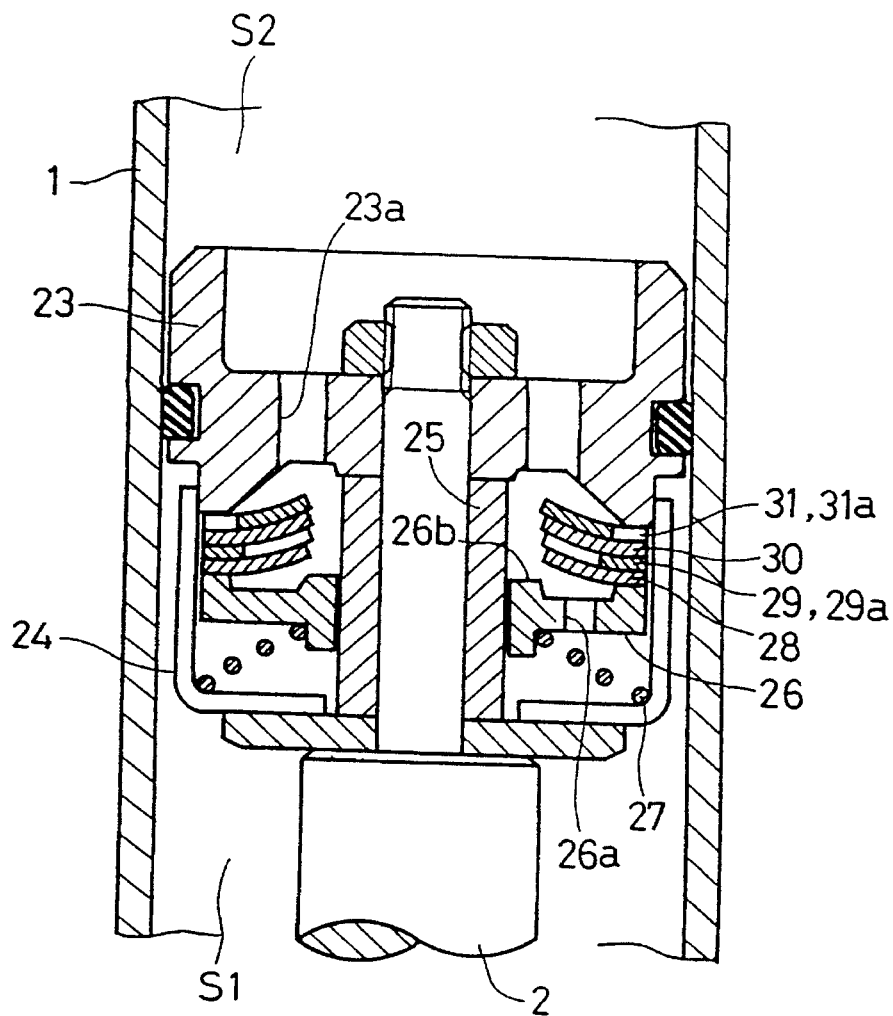
FIG. 9 is a fragmentary cross-sectional view of a damper around its piston, the damper incorporating a valve structure according to a third embodiment of the present invention.

As shown in FIG. 9, the damper has a piston 23 mounted on a distal end of a piston rod 2 and held in sliding contact with an inner circumferential surface of a cylinder 1. The piston 23 has a plurality of axial oil passages 23a defined therethrough, and a valve guide 24 is concentrically mounted on an axial end of the piston 23 around the piston rod 2. The valve guide 24 houses therein a collar 25 fitted over the piston rod 2, a valve holder 26 axially movably disposed between the collar 25 and the valve guide 24, and a spiral spring 27 acting between the valve holder 26 and the valve guide 24.

The valve holder 26 has a plurality of axial oil passages 26a defined therethrough and a valve seat 26b on an inner circumferential edge thereof. An axial stack of a resilient auxiliary valve 28, a resilient intermediate sheet 29, a resilient main valve 30, and a resilient upper valve 31, which are arranged successively in the order named from the valve seat 26b and are identical in inside and outside diameters to each other, is fixedly mounted on an outer circumferential marginal edge of the valve holder 26.

Figure 10:
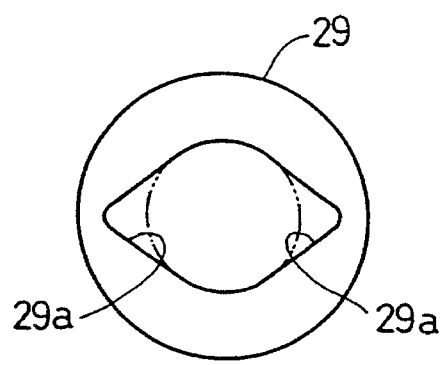
FIG. 10 is a plan view of an intermediate sheet in the valve structure shown in FIG. 9.

As shown in FIG. 10, the intermediate sheet 29 has a pair of diametrically opposite sectorial recesses 29a defined therein and opening toward a free inner circumferential edge thereof. The recesses 29a serve as a variable orifice to allow the auxiliary valve 28 to flex axially for thereby generating a damping force when the piston 23 moves in a low-speed range. The damping force characteristics of the damper in low- and medium-speed ranges can easily be varied by adjusting the size and number of the recesses 29a.

The upper valve 31 has a plurality of slits 31a defined at spaced intervals in an outer circumferential edge thereof. The upper valve 31 is held against an outer circumferential portion of the piston 23 by the valve holder 26 which is resiliently biased by the spring 27. The valve holder 26, the auxiliary valve 28, the intermediate sheet 29, the main valve 30, and the upper valve 31 jointly constitute a check valve. When the check valve is closed, the slits 31a of the upper valve 31 serve as a fixed orifice for generating a damping force when the piston 23 moves in the low-speed range.

Figure 11:
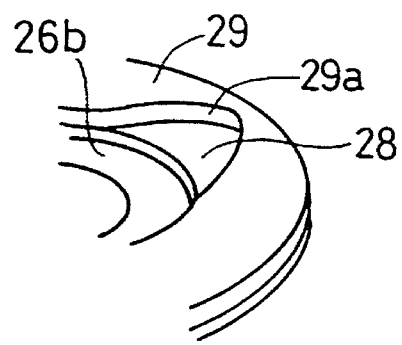
FIG. 11(a) is a fragmentary perspective view showing the manner in which the valve structure in the damper shown in FIG. 9 operates when the piston moves in a low-speed range.
FIG. 11(b) is a graph showing damping force characteristics of the damper at the time the valve structure operates as shown in FIG. 11(a)
Figure 11:
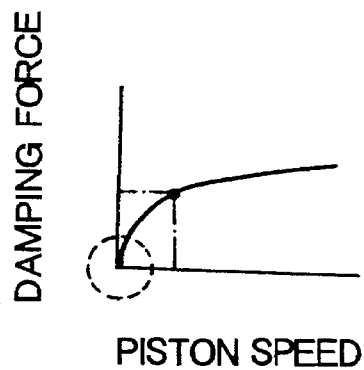

When the piston 23 moves in an expansion stroke in the low-speed range in which the oil pressure in the oil chamber S1 is slightly higher than that in the oil chamber S2, the auxiliary valve 28 does not open as shown in FIG. 11(a). At this time, the generated damping force gradually increases from a region encircled by a dotted-line circle in FIG. 11(b), depending on the opening of the fixed orifice composed of the slits 31a in the upper valve 31.

Figure 12:
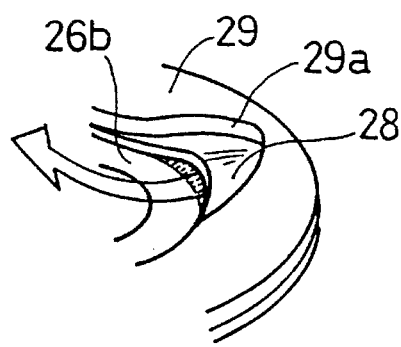
FIG. 12(a) is a fragmentary perspective view showing the manner in which the valve structure in the damper shown in FIG. 9 operates when the piston moves in a medium-speed range.
FIG. 12(b) is a graph showing damping force characteristics of the damper at the time the valve structure operates as shown in FIG. 12(a)
Figure 12:
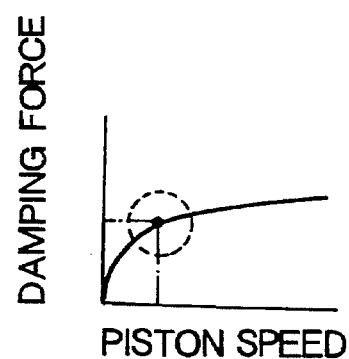

As the piston speed approaches a medium-speed range, working oil flowing into the oil passages 26a forces free-edge portions of the auxiliary valve 28 to flex axially into the corresponding recesses 29a in the intermediate sheet 29, as shown in FIG. 12(a), producing a damping oil path as indicated by the arrow in FIG. 12(a). Depending on the piston speed, the cross-sectional area of the damping oil path varies (increases), making the characteristic curve of the generated damping force smooth without inflections in a region encircled by a dotted-line circle in FIG. 12(b).

Figure 13:
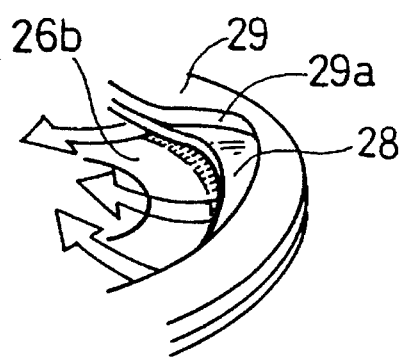
FIG. 13(a) is a fragmentary perspective view showing the manner in which the valve structure in the damper shown in FIG. 9 operates when the piston moves in a high-speed range.
FIG. 13(b) is a graph showing damping force characteristics of the damper at the time the valve structure operates as shown in FIG. 13(a)
Figure 13:
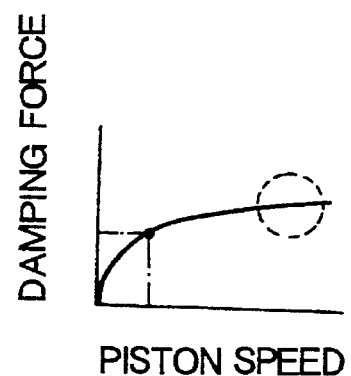
Figure 14:
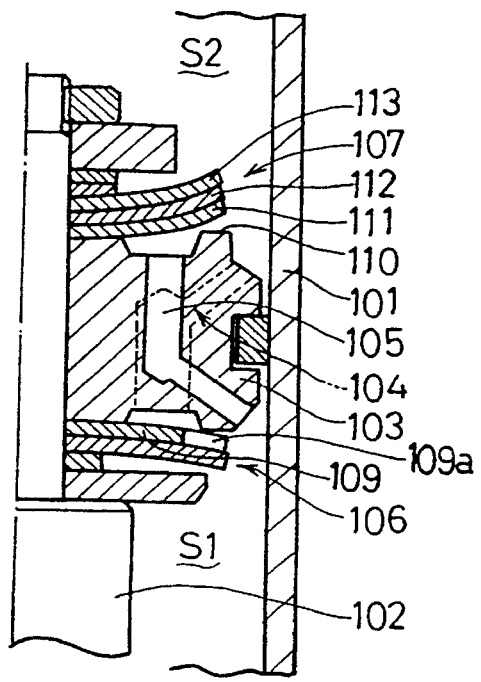
FIG. 14 is a fragmentary cross-sectional view of a damper around its piston, the damper incorporating a conventional valve structure.
Figure 15A:
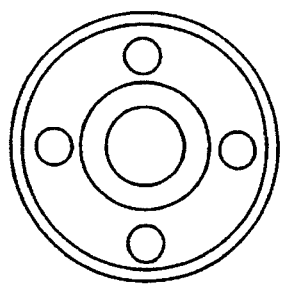
FIG. 15(a) is a plan view showing a conventional valve seat shape.
Figure 15B:
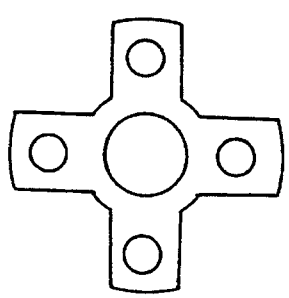
FIG. 15(b) is a plan view showing another conventional valve seat shape.
Figure 15C:
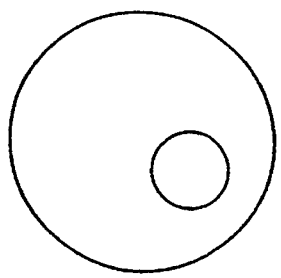
FIG. 15(c) is a plan view of a conventional intermediate sheet.

When the piston 23 moves in a high-speed range, the intermediate sheet 29 is flexed in its entirety under the pressure of working oil flowing into the oil passages 26a, opening the entire check valve, as shown in FIG. 13(a). Now, a damping force path as indicated by the arrows in FIG. 13(a) is formed between the check valve and the valve seat 26b in its entirety. At this time, since the valve seat 26b is of a circular shape, the generated damping force gradually increases, without a sharp rise, in a region encircled by a dotted-line circle in FIG. 13(b). In a compression stroke, the spring 27 flexes, and a fixed orifice is defined around the valve holder 26 which serves as part of the check valve. The valve structure shown in FIG. 9 in which the valves 28, 29, 30, 31 are supported at their outer circumferential edges on the piston 23 offers the same advantages as those of the valve structures according to the first and second embodiment in which the valves are supported at their inner circumferential edges.

In the third embodiment of the present invention, as described above, the intermediate sheet sandwiched between the main valve and the auxiliary valve is of the same overall inside and outside diameters between recesses as those of the main valve and the auxiliary valve, and has sectorial recesses. The intermediate sheet is effective to provide substantially linear damping force characteristics from the medium-speed range to the high-speed range, and damping force characteristics determined by the valve seat in the high-speed range. It is also easy to grasp the correlation between the shape of the intermediate sheet and the generated damping force depending on the number, shape, angle, and depth of the recesses in the intermediate sheet.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A hydraulic damper, comprising:

a cylinder;

a piston rod axially movable in said cylinder;

a dividing member mounted on an end of the piston rod and dividing an interior space of the cylinder into first and second fluid chambers, one on each side of the dividing member, the dividing member having passages to permit the passage of fluid between the first and second chambers and a valve seat;

an annular, resilient valve assembly having inner and outer circumferential edges, one of the circumferential edges being fixed with respect to the dividing member, the other of the circumferential edges being free and seatable on said valve seat;

the valve assembly comprising an annular auxiliary resilient valve, an annular intermediate resilient sheet and an annular resilient main valve, said annular auxiliary resilient valve, said annular intermediate resilient sheet and said annular resilient main valve being stacked in the order named from said valve seat;

the free circumferential edge of the annular intermediate resilient sheet being interrupted by at least one recess which opens from the free circumferential edge;

the annular auxiliary resilient valve, the annular intermediate resilient sheet and the annular resilient main valve having identical overall inside and outside circumferential edge diameters except at the recess;

whereby said annular resilient valve assembly can flex away from the valve seat depending on a differential pressure between the first and second chambers to produce a damping oil path for applying a damping force against axial movement of said piston rod with respect to said cylinder, the recess in the free circumferential edge of the annular intermediate resilient sheet allowing a portion of the annular auxiliary resilient valve to flex away from the valve seat to produce a damping oil path independently of the remainder of the valve assembly.

2. A valve structure according to claim 1, wherein said valve seat is of a circular shape.

3. A valve structure according to claim 1, wherein said recess is of a sectorial shape.

4. A valve structure according to claim 1, wherein said recess is of a semicircular shape.

5. A valve structure according to claim 1, wherein said recess is of a U shape.

6. The hydraulic damper of claim 1, wherein the inner circumferential edge of the valve assembly is fixed with respect to the divider and the outer circumferential edge is free with respect to the divider.

7. The hydraulic damper of claim 1, wherein the outer circumferential edge of the valve assembly is fixed with respect to the divider and the inner circumferential edge is free with respect to the divider.

8. The hydraulic damper of claim 7, wherein the dividing member further comprises a valve guide enclosing the outer circumferential edge of the valve assembly, a piston provided with at least one fluid passage, a circular valve holder carried within the valve guide and having at least one fluid passage, the valve holder being provided with the valve seat and the valve assembly being disposed between the piston and the valve holder.

9. The hydraulic damper of claim 8, wherein the valve assembly further comprises an annular, resilient upper valve stacked above the main valve with respect to the valve seat, the upper valve having an outer circumference that is interrupted with at least one slit, the valve assembly being carried by the piston.

10. The hydraulic damper of claim 9, wherein the valve holder is movable with respect to the valve guide, further comprising a spring to urge the valve holder toward the piston.

11. A hydraulic damper, comprising:

a cylinder;

a piston rod axially movable in said cylinder;

a dividing member mounted on an end of the piston rod and dividing an interior space of the cylinder into first and second fluid chambers, one on each side of the dividing member, the dividing member having passages to permit the passage of fluid between the first and second chambers and a valve seat;

an annular, resilient valve assembly having inner and outer circumferential edges, one of the circumferential edges being fixed with respect to the dividing member, the other of the circumferential edges being free and seatable on said valve seat;

the valve assembly comprising an annular auxiliary resilient valve, and an annular resilient main valve, said annular auxiliary resilient valve, and said annular resilient main valve being stacked in the order named from said valve seat;

the free circumferential edge of the annular resilient main valve being interrupted by at least one recess which opens from the free circumferential edge;

the annular auxiliary resilient valve and the annular resilient main valve having identical overall inside and outside circumferential edge diameters except at the recess;

whereby said annular resilient valve assembly can flex away from the valve seat depending on a differential pressure between the first and second chambers to produce a damping oil path for applying a damping force against axial movement of said piston rod with respect to said cylinder, the recess in the free circumferential edge of the annular resilient main valve allowing a portion of the annular auxiliary resilient valve to flex away from the valve seat to produce a damping oil path independently of the remainder of the valve assembly.

12. The hydraulic damper of claim 11, wherein the valve seat is circular.

13. The hydraulic damper of claim 11, wherein the recess is of a sectorial shape.

14. The hydraulic damper of claim 11, wherein the recess is of a semicircular shape.

15. The hydraulic damper of claim 11, wherein the recess is of a U shape.

16. A valve assembly for use in a hydraulic damper which comprises a cylinder, a piston rod axially movable in said cylinder, and a dividing member mounted on an end of the piston rod and dividing an interior space of the cylinder into first and second fluid chambers, one on each side of the dividing member, the dividing member having passages to permit the passage of fluid between the first and second chambers and a valve seat, the valve assembly being annular and resilient and comprising:

inner and outer circumferential edges, one of the circumferential edges to be fixed with respect to the dividing member, the other of the circumferential edges to be free and seatable on said valve seat;

the valve assembly further comprising an annular auxiliary resilient valve, an annular intermediate resilient sheet and an annular resilient main valve, said annular auxiliary resilient valve, said annular intermediate resilient sheet and said annular resilient main valve to be stacked in the order named from said valve seat;

the free circumferential edge of the annular intermediate resilient sheet being interrupted by at least one recess which opens from the free circumferential edge;

the annular auxiliary resilient valve, the annular intermediate resilient sheet and the annular resilient main valve having identical overall inside and outside circumferential edge diameters except at the recess;

whereby said annular resilient valve assembly can flex away from the valve seat depending on a differential pressure between the first and second chambers to produce a damping oil path for applying a damping force against axial movement of said piston rod with respect to said cylinder, the recess in the free circumferential edge of the annular intermediate resilient sheet allowing a portion of the annular auxiliary resilient valve to flex away from the valve seat to produce a damping oil path independently of the remainder of the valve assembly.

17. A valve assembly for use in a hydraulic damper which comprises a cylinder, a piston rod axially movable in said cylinder, and a dividing member mounted on an end of the piston rod and dividing an interior space of the cylinder into first and second fluid chambers, one on each side of the dividing member, the dividing member having passages to permit the passage of fluid between the first and second chambers and a valve seat, the valve assembly being annular and resilient and comprising:

inner and outer circumferential edges, one of the circumferential edges to be fixed with respect to the dividing member, the other of the circumferential edges to be free and seatable on said valve seat;

the valve assembly further comprising an annular auxiliary resilient valve, and an annular resilient main valve, said annular auxiliary resilient valve, and said annular resilient main valve to be stacked in the order named from said valve seat;

the free circumferential edge of the annular resilient main valve being interrupted by at least one recess which opens from the free circumferential edge;

the annular auxiliary resilient valve and the annular resilient main valve having identical overall inside and outside circumferential edge diameters except at the recess;

whereby said annular resilient valve assembly can flex away from the valve seat depending on a differential pressure between the first and second chambers to produce a damping oil path for applying a damping force against axial movement of said piston rod with respect to said cylinder, the recess in the free circumferential edge of the annular resilient main valve allowing a portion of the annular auxiliary resilient valve to flex away from the valve seat to produce a damping oil path independently of the remainder of the valve assembly.

* * * * *